United States Patent
An et al.

(10) Patent No.: US 8,515,455 B2
(45) Date of Patent: Aug. 20, 2013

(54) METHOD AND APPARATUS FOR LOCATION UPDATE IN MOBILE COMMUNICATION SYSTEM

(75) Inventors: Dong-Hwan An, Suwon-si (KR); Yong-Soo Song, Seoul (KR); Eun-Seok Yang, Seoul (KR); Sung-Kyu Chang, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 13/345,562

(22) Filed: Jan. 6, 2012

(65) Prior Publication Data
US 2012/0178474 A1    Jul. 12, 2012

(30) Foreign Application Priority Data

Jan. 10, 2011 (KR) .................. 10-2011-0002158

(51) Int. Cl.
*H04W 24/00*    (2009.01)
(52) U.S. Cl.
USPC .......... 455/456.2; 455/456.1; 455/456.5; 455/419; 455/423; 370/260; 370/230.1
(58) Field of Classification Search
USPC .......... 455/456.2, 433, 435.1, 426.1, 419, 455/427, 423, 456.5; 370/349, 260, 230.1; 375/341; 701/517; 707/E17.007, 999.01; 342/457; 726/6; 709/223

See application file for complete search history.

(56) References Cited

U.S. PATENT DOCUMENTS

| | | | | |
|---|---|---|---|---|
| 5,713,073 | A * | 1/1998 | Warsta ..................... | 455/524 |
| 6,240,069 | B1 * | 5/2001 | Alperovich et al. ......... | 370/260 |
| 7,457,624 | B2 * | 11/2008 | Shinoda ..................... | 455/440 |
| 2002/0065907 | A1 * | 5/2002 | Cloonan et al. ............ | 709/223 |
| 2006/0079219 | A1 * | 4/2006 | Nicolini .................... | 455/423 |
| 2007/0298801 | A1 | 12/2007 | Kim et al. | |
| 2009/0217364 | A1 * | 8/2009 | Salmela et al. ............. | 726/6 |
| 2010/0279676 | A1 * | 11/2010 | Benn et al. ................. | 455/419 |

FOREIGN PATENT DOCUMENTS

KR    10-2010-0047471    5/2010

* cited by examiner

*Primary Examiner* — Mahendra Patel

(57) ABSTRACT

A method and apparatus enhances a location update success rate in a mobile communication terminal. The method includes trying the location update, determining whether a reject cause is a major cause when the location update is rejected, retrying the location update using a current location indicator when the reject cause is the major cause, and retrying the location update using a different location indicator when the retried location update is rejected.

15 Claims, 4 Drawing Sheets

METHOD AND APPARATUS FOR LOCATION UPDATE IN MOBILE COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jan. 10, 2011 and assigned Serial No. 10-2011-0002158, the entire disclosure of which is hereby incorporated by reference.

TECHNICAL FIELD OF THE INVENTION

The present invention relates to a mobile communication system.

BACKGROUND OF THE INVENTION

As techniques have been developed, a variety of mobile communication terminals which gradually specialize for persons have been provided. In this mobile communication environment, in order to classify communication entities and provide services according to the classified communication entities, the most basic process is performed. That is, a mobile communication terminal is normally recognized on a network to allow a user to use all services provided from the mobile communication terminal.

In this example, a method basically used for classifying the user and services the user joins uses a registration process which is performed between the mobile communication terminal and the network during a process of booting the mobile communication terminal after the user inserts a Subscriber Identity Module (SIM) card into the mobile communication terminal.

If the registration process is normally performed, it is authenticated that the user is an authorized user and the mobile communication terminal may use services.

There is a location update process during this registration process. If the mobile communication terminal must normally perform the location update process, it may use a voice telephone service, a video telephone service, a Short Message Service (SMS), and all the other services well.

However, even though the user uses a normal SIM card and a normal mobile communication terminal, there is a problem in that a location update is not normally performed by unknown cause and the mobile communication terminal is shifted to a limited service state due to reject of the location update.

Therefore, a method and apparatus for allowing a mobile communication terminal to be not shifted to the limited service state is needed.

SUMMARY OF THE INVENTION

To address the above-discussed deficiencies of the prior art, it is a primary object to provide at least the advantages described below. Accordingly, a primary aspect of the present disclosure is to provide a method and apparatus for performing a location update in a mobile communication system.

Another aspect of the present disclosure is to provide a method and apparatus for providing a normal service to a user by preventing reject of a location update intermittently generated by a network problem even though the user uses a normal SIM card and a normal mobile communication terminal and preventing a limited service state of the mobile communication terminal due to the reject of the location update in a mobile communication system.

Another aspect of the present disclosure is to provide a method and apparatus for preventing a service disable state from being generated in a mobile communication terminal when a location update is temporarily rejected due to major cause by a network even though the mobile communication terminal uses a normal International Mobile Subscriber Identity (IMSI) and a normal International Mobile Equipment Identity (IMEI) in a mobile communication system.

In accordance with an aspect of the present disclosure, a method of performing, a location update of a mobile communication is provided. The method includes trying the location update, determining whether a reject cause is a major cause when the location update is rejected, retrying the location update using a current location indicator when the reject cause is the major cause, and retrying the location update using a different location indicator when the retried location update is rejected.

In accordance with another aspect of the present disclosure, an apparatus for performing a location update of a mobile communication terminal is provided. The apparatus includes a modem for communicating with a different node and a controller for trying the location update through the modem, determining whether a reject cause is a major cause when the location update is rejected, retrying the location update using a current location indicator when the reject cause is the major cause, and retrying the location update using a different location indicator when the retried location update is rejected.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a method and apparatus for performing a location update in a mobile communication system according to an embodiment of the present disclosure will be described in detail.

The present disclosure relates to a method and apparatus for enhancing a location update success rate in a mobile communication terminal.

Figure 1:
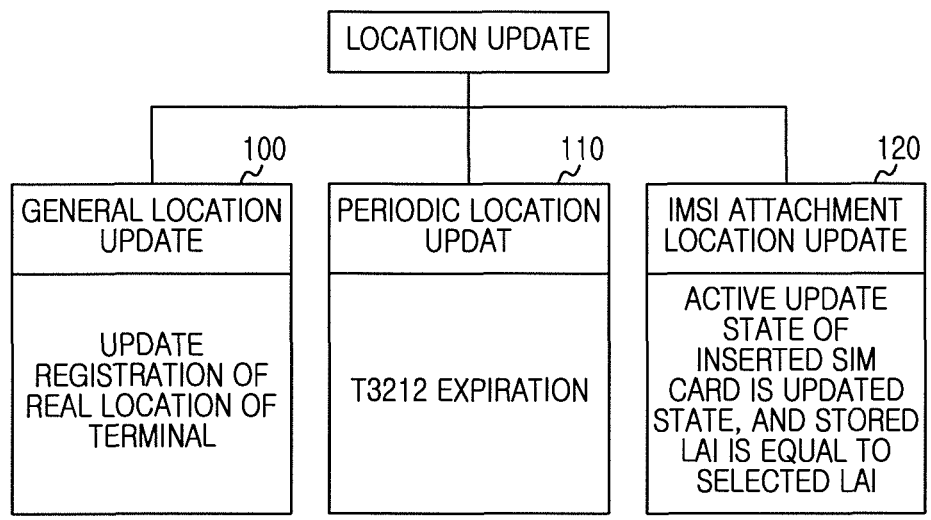
FIG. 1 illustrates location update processes which are classified according to an embodiment of the present disclosure.

FIG. 1 illustrates location update processes which are classified according to an embodiment of the present disclosure.

Referring to FIG. 1, in accordance with the standard, a location update process performed for registering a mobile communication terminal may be classified into the following three processes.

Firstly, there is a general location update process 100. The general location update process 100 may be a location update process performed such that the mobile communication terminal registers its own location on a network. The general location update process 100 may correspond to a process of booting the mobile communication terminal after a user inserts a SIM card into the mobile communication terminal.

Secondly, there is a periodic location update process 110. The periodic location update process 110 may be a location update process performed such that the mobile communication terminal informs its own location to the network at intervals of timer T3212 values defined on the network.

Thirdly, there is an IMSI attachment location update process 120. The IMSI attachment location update process 120 is a process performed for informing the network that an IMSI of the mobile communication terminal is in an active state. The IMSI attachment location update process 120 indicates that an active update state of an inserted SIM card is an updated state and a stored location indicator, that is, a stored LAI is equal to a selected LAI.

Figure 2:
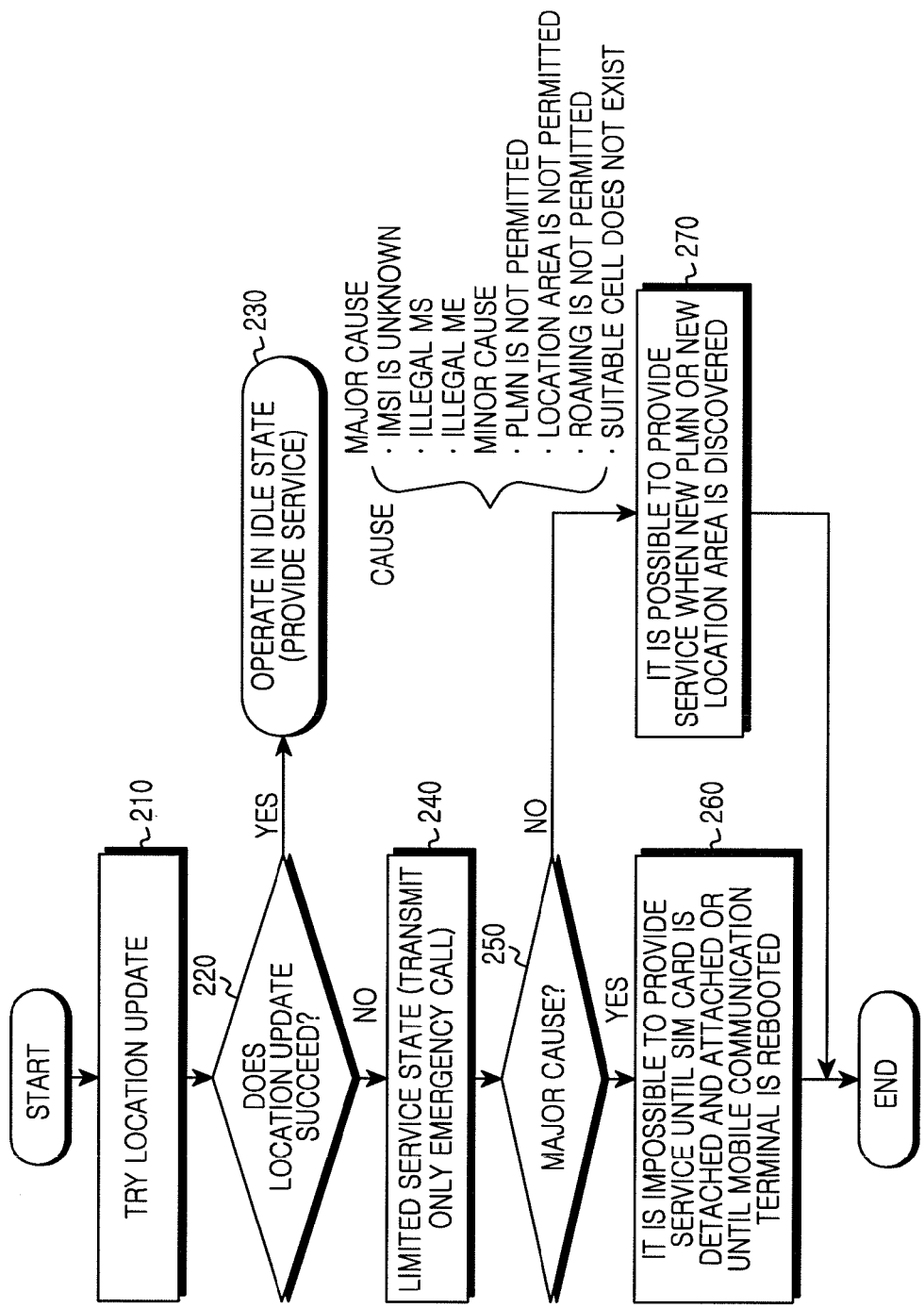
FIG. 2 illustrates a process of performing a location update according to an embodiment of the present disclosure.

FIG. 2 illustrates a process of performing a location update according to an embodiment of the present disclosure.

Referring to FIG. 2, in general, a mobile communication terminal tries a location update for registering its own location after being booted (step 210).

If the location update succeeds (step 220), the mobile communication terminal operates in an idle state and provides a normal service to a user (step 230).

If the location update does not succeed (step 220), the mobile communication terminal operates in a limited service state (step 240). The mobile communication terminal may only transmit an emergency call in the limited service state. That is, only the emergency call may be possible.

In accordance with the standard, a reject cause of a location update received from a network when a location update of the mobile communication terminal is rejected is classified into the following two general types.

Firstly, by way of example, and without limitation, there may be the following causes when the reject cause is a major cause.

1) An IMSI is unknown in a Home Location Register (HLR). That is, the HLR determines that an IMSI value of a SIM card is not valid.

2) The mobile communication terminal is an illegal Mobile Station (MS). That is, a problem occurs in an IMEI value of the mobile communication terminal or an IMSI value of the SIM card. In this example, the IMSI value or the IMEI value is not valid.

3) The mobile communication terminal is illegal Mobile Equipment (ME). That is, a problem occurs in an IMEI value of the mobile communication terminal. That is, the IMEI value is not valid.

Secondly, for example, without limitation, there may the following causes when the reject cause is not a major cause, that is, when the location update is rejected by a minor cause.

1) A Public Land Mobile Network (PLMN) where the mobile communication terminal is positioned is not permitted at the mobile communication terminal.

2) A location area where the mobile communication terminal is positioned is not permitted at the mobile communication terminal.

3) Roaming where the mobile communication is positioned is not permitted at the mobile communication terminal.

4) A cell suitable for the mobile communication terminal does not exist.

If the reject cause is the minor cause (step 250), the mobile communication terminal may perform a network registration process according to the respective causes (step 270). That is, if the mobile communication terminal discovers a new PLMN or location area, it retries a location update.

However, when the reject cause is the major cause (step 250), the mobile communication terminal immediately operates in a limited service state. The mobile communication terminal remains in a recovery disable state until a user turns on or off the mobile communication terminal or until the user attaches a SIM card after detaching it (step 260).

However, even through a problem does not occur in the IMSI of the SIM card and the IMEI of the mobile communication terminal, it occurs temporarily from a network by an unspecified cause.

Figure 3:
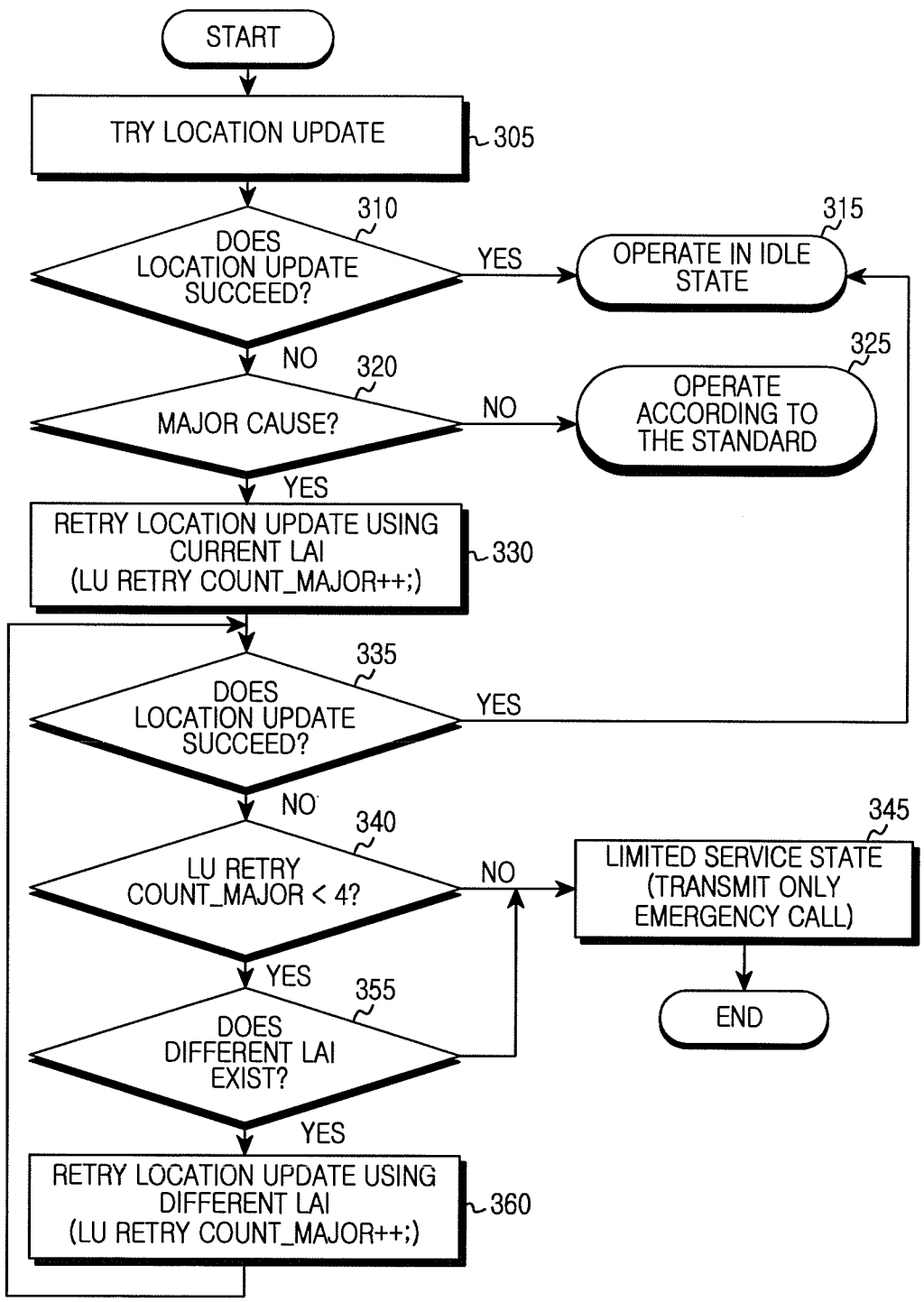
FIG. 3 illustrates a process of performing a location update using a different location area identity (LAI) according to an embodiment of the present disclosure.

FIG. 3 illustrates a process of performing a location update using a different LAI according to an embodiment of the present disclosure.

Referring to FIG. 3, a mobile communication terminal tries a location update (step 305).

If the location update succeeds (step 310), the mobile communication terminal operates in an idle state and provides a normal service to a user (step 315).

If the location update does not succeed (step 310) and a reject cause of the location update is not a major cause (that is, a minor cause) (step 320), the mobile communication terminal operates according to the standard (step 325).

If the location update does not succeed (step 310) and the reject cause of the location update is the major cause (step 320), the mobile communication terminal retries the location update using a current LAI and increases a counter by 1 (e.g., LU Retry Count_Major++;) (step 330). Herein, it is assumed that an initial value of the counter is 0.

If the retried location update succeeds (step 335), the mobile communication terminal operates in the idle state and provides the normal service to the user (step 315).

However, the retried location update does not succeed (step 335), the mobile communication terminal retries the location update using a different LAI until the counter value is 3 (step 340), that is, until the total number of times to retry the location update is 4 when the different LAI exists (steps 355 and 360).

If the location update succeeds during these repeated processes (step 335), the mobile communication terminal operates in the idle state and provides the normal service to the user (step 315).

If the location update does not succeed although these location update processes are repeated, the mobile communication terminal operates in a limited service state (step 345). It is possible for the mobile communication terminal to transmit only an emergency call in the limited service state.

Before this location update process, the mobile communication terminal determines validity of its own IMSI and IMEI. If the IMSI and IMEI are valid, the mobile communication terminal performs the location update process described above.

Figure 4:
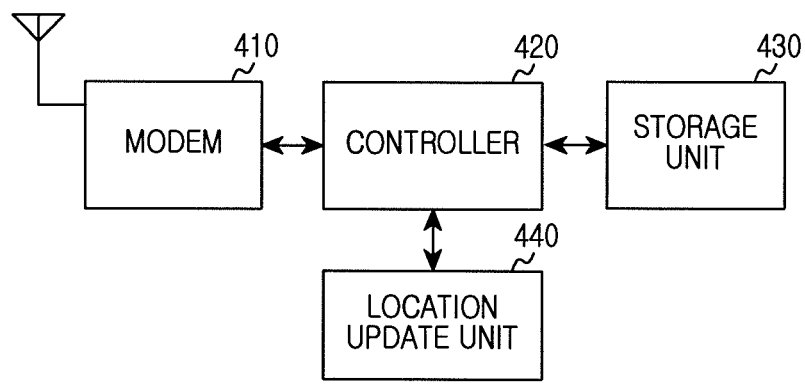
FIG. 4 is a block diagram illustrating a structure of a mobile communication terminal according to an embodiment of the present disclosure.

FIG. 4 illustrates a structure of a mobile communication terminal according to an embodiment of the present disclosure.

Referring to FIG. 4, the mobile communication terminal includes a modem 410, a controller 420, a storage unit 430, and a location update unit 440.

The modem 410 is a module for communicating with a different device. The modem 410 includes a radio frequency processor, a baseband processor, etc. The radio frequency processor converts a signal received through an antenna into a baseband signal and provides the baseband signal to the baseband processor. The radio frequency processor converts a baseband signal from the baseband processor into a radio frequency signal to be transmitted on a real radio path and transmits the radio frequency signal through the antenna. Radio access technology of the modem 410 is not limited.

The controller 420 controls an overall operation of the mobile communication terminal. Particularly, the controller controls the location update unit 440 according to an embodiment of the present disclosure.

The storage unit 430 stores programs for controlling the overall operation of the mobile communication terminal and temporary data generated while the programs are executed.

The location update unit 440 performs a location update. If the location update succeeds, the location update unit 440 operates in an idle state and provides a normal service to a user.

If the location update does not succeed and a reject cause of the location update is not a major cause, the location update unit 440 operates according to the standard.

If the location update does not succeed and the reject cause of the location update is the major cause, the location update unit 440 retries the location update using a current LAI.

If the retried location update succeeds, the location update unit 440 operates in the idle state and provides the normal service to the user.

However, if the retried location update does not succeed, the location update unit 440 retries the location update using a different LAI until the total number of times to retry the location update is 4 when the different LAI exists.

If the location update succeeds during these repeated processes, the location update unit 440 operates in the idle state and provides the normal service to the user If the location update does not succeed although these location update processes are repeated, the location update unit 440 operates in a limited service state. It is possible for the mobile communication terminal to transmit only an emergency call in the limited service state.

Before the location update process, the location update unit 440 determines validity of its own IMSI and IMEI. If the IMSI and IMEI are valid, the location update unit 440 performs the location update process described above.

In the structure described above, the controller 420 may perform the function of the location update unit 440. The present disclosure includes the controller 420 and the location update unit 440 separately to differentially describe the respective functions thereof.

Therefore, when the present disclosure is implemented as a real product, all functions of the location update unit 440 may be performed in the controller 420. Only some of the functions of the location update unit 440 may be performed in the controller 420.

The present disclosure has an advantage in that the mobile communication terminal may be successfully registered on a network using a different LAI when a location update of the mobile communication terminal is temporarily rejected by a network problem.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of performing a location update by a mobile communication terminal, the method comprising:
    trying the location update;
    determining whether a reject cause is a major cause when the location update is rejected;
    retrying the location update using a first location indicator when the reject cause is the major cause; and
    retrying the location update using at least one different location indicator subsequently until a number of retry attempts of the location update is a certain number when the at least one different location indicator exists and when the retried location update is rejected,
    wherein the major cause is one of an International Mobile Subscriber Identity (IMSI) value of the mobile communication terminal and an International Mobile Equipment Identity (IMEI) value of the mobile communication terminal not being valid.

2. The method of claim 1 further comprising:
    operating in an idle state when the location update succeeds.

3. The method of claim 1 further comprising:
    operating according to a standard when the reject cause is not the major cause, the standard comprising discovering a new Public Land Mobile Network (PLMN) or location area.

4. The method of claim 1, further comprising:
    operating in a limited service state when one of the second location indicator does not exist and the location update using the second location indicator is rejected the certain number of times.

5. The method of claim 1, wherein the second location indicator is a location area identity (LAI).

6. A mobile communication terminal comprising:
    a modem configured to communicate with a different node; and
    a controller configured to try the location update through the modem, determine whether a reject cause is a major cause when the location update is rejected, retry the location update using a first location indicator when the reject cause is the major cause, and retry the location update using at least one different location indicator subsequently until a number of retry attempts of the location update is a certain number when the at least one different location indicator exists and when the retried location update is rejected wherein the major cause is one of an International Mobile Subscriber Identity (IMSI) value of the mobile communication terminal and an International Mobile Equipment Identity (IMEI) value of the mobile communication terminal not being valid.

7. The mobile communication terminal of claim 6, wherein the controller is further configured to operate in an idle state when the location update succeeds.

8. The mobile communication terminal of claim 6, wherein the controller is further configured to operate according to a standard when the reject cause is not the major cause, the standard comprising discovering a new Public Land Mobile Network (PLMN) or location area.

9. The mobile communication terminal of claim 6, wherein the controller is further configured to operate in a limited service state when one of the second location indicator does not exist and the location update using the second location indicator is rejected the certain number of times.

10. The mobile communication terminal of claim 6, wherein the second location indicator is a location area identity (LAI).

11. A wireless communication system configured to perform a location update of a mobile communication terminal, the system comprising:
 a network node;
 a modem, in the mobile communication terminal, configured to communicate with the network node; and
 a controller, in the mobile communication terminal, the controller configured to try the location update through the modem, determine whether a reject cause is a major cause when the location update is rejected, retry the location update using a first location indicator when the reject cause is the major cause, and retry the location update using at least one different location indicator subsequently when the retried location update is rejected and the at least one different location indicator used until a number of retry attempts of the location update is a certain number when the at least one different location indicator exists, wherein the major cause is one of an International Mobile Subscriber Identity (IMSI) value of the mobile communication terminal and an International Mobile Equipment Identity (IMEI) value of the mobile communication terminal not being valid.

12. The system of claim 11, wherein the controller is further configured to operate in an idle state when the location update succeeds.

13. The system of claim 11, wherein the controller is further configured to operate according to a standard when the reject cause is not the major cause, the standard comprising discovering a new Public Land Mobile Network (PLMN) or location area.

14. The system of claim 11, wherein the controller is further configured to operate in a limited service state when one of the second location indicator does not exist and the location update using the second location indicator is rejected the certain number of times.

15. The system of claim 11, wherein the second location indicator is a location area identity (LAI).

* * * * *